United States Patent
Dellon et al.

(10) Patent No.: US 11,121,421 B2
(45) Date of Patent: Sep. 14, 2021

(54) BATTERY THERMAL MANAGEMENT SYSTEM

(71) Applicant: Boston Dynamics, Inc., Waltham, MA (US)

(72) Inventors: Brian Todd Dellon, West Roxbury, MA (US); John Aaron Saunders, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 158 days.

(21) Appl. No.: 16/448,642

(22) Filed: Jun. 21, 2019

(65) Prior Publication Data

US 2019/0312323 A1    Oct. 10, 2019

Related U.S. Application Data

(62) Division of application No. 14/932,116, filed on Nov. 4, 2015, now Pat. No. 10,374,272.

(51) Int. Cl.
*H01M 10/00* (2006.01)
*H01M 10/6569* (2014.01)
(Continued)

(52) U.S. Cl.
CPC ... *H01M 10/6569* (2015.04); *H01M 10/0525* (2013.01); *H01M 10/6552* (2015.04)

(58) Field of Classification Search
CPC ......... H01M 10/6569; H01M 10/6552; H01M 10/0525; H01M 50/20; H01M 10/6551; Y02E 60/10
See application file for complete search history.

(56) References Cited

U.S. PATENT DOCUMENTS 6,783,886 B1    8/2004   Sakakibara et al.
8,911,895 B2   12/2014   Huang et al.
(Continued)

FOREIGN PATENT DOCUMENTS

CN    203351712 U    12/2013
WO    2010028692 A1    3/2010

OTHER PUBLICATIONS

Matthew George Myers, "Lithium-Ion Battery Thermal Management Systems Using Flexible Graphite Heat Dissipaters", Thesis, May 2012.. 53 pages.

*Primary Examiner* — Nicholas P D'Aniello
(74) *Attorney, Agent, or Firm* — Honigman LLP; Brett A. Krueger

(57) ABSTRACT

An example system is disclosed for thermal management of batteries. The system may include a cell bank that includes first and second cell frame sections, a heat bus, and thermal interface material. The first and second cell frame sections may define opposite surfaces of the cell bank. Each cell frame section may include recesses to align battery cells for welding and provided conductive connections between the cells to create a string of cells with a combined power output. Each recess may include a divider between the battery cells to preload the cells against a thermal junction during assembly. The heat bus may be provided between the cell frame sections. The heat bus may include heat pipes that extend between the battery cells and across the cell frame sections. The thermal interface material may be positioned to transfer heat from the cells to the heat pipes at their thermal junction.

21 Claims, 11 Drawing Sheets

(51) Int. Cl.
*H01M 10/0525* (2010.01)
*H01M 10/6552* (2014.01)

(56) References Cited

U.S. PATENT DOCUMENTS

| | | |
|---|---|---|
| 2008/0003491 A1 | 1/2008 | Yahnker et al. |
| 2008/0280192 A1 | 11/2008 | Drozdz et al. |
| 2010/0252238 A1 | 10/2010 | Batty et al. |
| 2012/0028087 A1 | 2/2012 | Gaben et al. |
| 2012/0028099 A1 | 2/2012 | Aoki |
| 2013/0149575 A1 | 6/2013 | Gebbie et al. |
| 2013/0230760 A1* | 9/2013 | Pan .................... H01M 2/1077 429/120 |
| 2014/0154548 A1 | 6/2014 | Dillmann et al. |
| 2015/0244036 A1 | 8/2015 | Lane et al. |

* cited by examiner

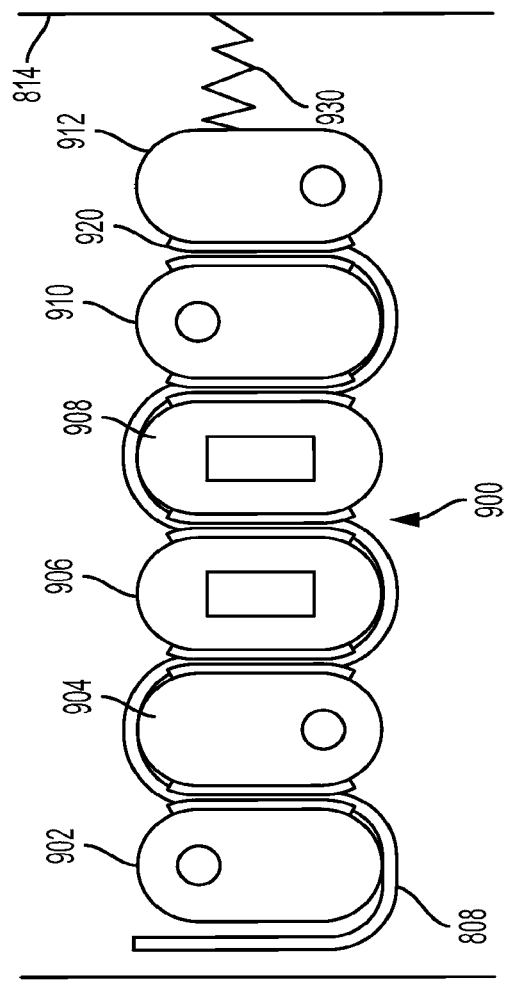
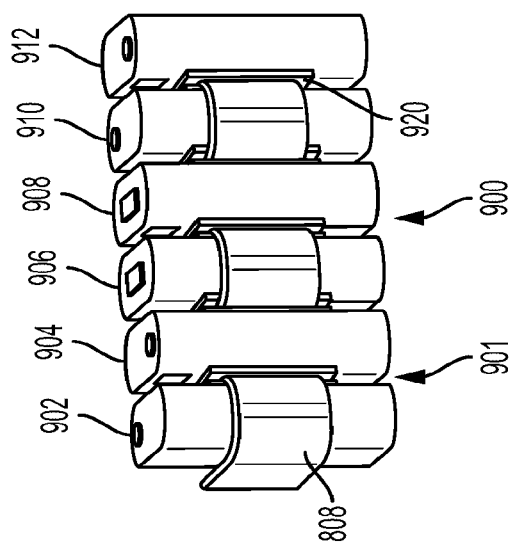

BATTERY THERMAL MANAGEMENT SYSTEM

CROSS REFERENCE TO RELATED APPLICATIONS

This U.S. patent application is a divisional of, and claims priority under 35 U.S.C. § 121 from, U.S. patent application Ser. No. 14/932,116, filed on Nov. 4, 2015. The disclosure of this prior applications is considered part of the disclosure of this application and is hereby incorporated by reference in its entirety.

BACKGROUND

Improvements in technology have caused many electronic systems to operate more effectively. One contributing factor to the effectiveness of electronic systems is their corresponding power supply technology. In particular, improvements in power supply technology can improve the effectiveness of electronic systems. Batteries are one type of power supply used by many electronic systems. Thus, improvements in battery technology can enable many electronic systems to operate more effectively.

SUMMARY

One Example systems may be provided for a power supply device that regulates battery temperature. The power supply device may include an enclosure that houses multiple cell banks. Each cell bank may contain multiple batteries, a cell frame to align the batteries, and a heat bus to cool the batteries. The cell frame may align the batteries for welding to weld straps to generate a combined power output of the battery cells.

The heat bus may use a heat sink and heat pipes (or vapor chambers) to cool the batteries. Heat pipes (or vapor chambers) may receive heat from the batteries and transfer the heat to a connected heat sink. Thermal interface material disposed between the batteries and heat pipes (or vapor chambers) may increase heat transfer. The batteries may be forced apart by the cell frame into contact with the thermal interface material, which may enable efficient cooling of the batteries. The cell frame's intra-cellular spacing may accommodate swelling of the batteries over time once the batteries are forced apart.

The cell bank may be attached to the enclosure of the power supply device by inserting the heat sink into a heat sink attachment notch of the enclosure. This configuration allows heat transferred from the batteries to the heat sink via the heat bus to be released into an environment surrounding the power supply device. The enclosure may also include a watertight seal to prevent entry of liquid into the enclosure. Thus, the power supply device provides a conduction path from the batteries to an exterior surface of the enclosure without relying on external fluids to pass through the inside of the enclosure for cooling of the batteries. This configuration improves the reliability of the power supply device while also efficiently cooling the batteries.

In one example, a cell bank device is provided that includes a first cell frame section, defining a first surface of the cell bank device, including a plurality of recesses to align battery cells, wherein each recess includes a divider positioned at a middle of the recess between a first battery cell and a second battery cell to provide spacing between the first and second battery cells. The cell bank device may also include a second cell frame section, defining a second surface of the cell bank device opposite to the first surface of the cell bank device, to align the battery cells, wherein at least one of the first cell frame section and the second cell frame section comprises a material that provides conductive connections between the battery cells to create a string of cells with a combined power output. The cell bank device may additionally include one or more portions of thermal interface material positioned around the battery cells to transfer heat from the battery cells, wherein the divider causes the battery cells to contact the one or more portions of thermal interface material. The cell bank device may further include a heat bus provided between the first cell frame section and the second cell frame section, wherein the heat bus includes heat pipes extending between the battery cells and across the first cell frame section and the second cell frame section, wherein the heat bus contacts the one or more portions of thermal interface material to transfer heat from the battery cells to the heat pipes of the heat bus.

In an additional example, a power supply device may include an enclosure configured to house one or more cell banks. The power supply device may also include one or more cell banks provided within the enclosure, wherein each cell bank includes a first cell frame section, defining a first surface of the cell bank, including a plurality of recesses to align battery cells, wherein each recess includes a divider positioned at a middle of the recess between a first battery cell and a second battery cell to provide spacing between the first and second battery cells. Each cell bank may also include a second cell frame section, defining a second surface of the cell bank opposite to the first surface of the cell bank, to align the battery cells, wherein at least one of the first cell frame section and the second cell frame section comprises a material that provides conductive connections between the battery cells to create a string of cells with a combined power output. Each cell bank may further include one or more portions of thermal interface material positioned around the battery cells to transfer heat from the battery cells, wherein the divider causes the battery cells to contact the one or more portions of thermal interface material. Each cell bank may additionally include a heat bus provided between the first cell frame section and the second cell frame section, wherein the heat bus includes heat pipes extending between the battery cells and across the first cell frame section and the second cell frame section, wherein the heat bus contacts the one or more portions of thermal interface material to transfer heat from the battery cells to the heat pipes of the heat bus.

In another example, a power supply device is disclosed that includes an enclosure configured to house one or more cell banks. The power supply device may also include one or more cell banks provided within the enclosure, wherein each cell bank includes a first cell frame section, defining a first surface of the cell bank, including a plurality of recesses to align battery cells. Each cell bank may also include a second cell frame section, defining a second surface of the cell bank opposite to the first surface of the cell bank, to align the battery cells, wherein at least one of the first cell frame section and the second cell frame section comprises a material that provides conductive connections between battery cells to create a string of cells with a combined power output. Each cell bank may additionally include one or more portions of thermal interface material contacting the battery cells to transfer heat from the battery cells. Each cell bank may further include one or more vapor chambers provided between the first cell frame section and the second cell frame section, wherein the one or more vapor chambers serpentine between battery cells of one or more battery cells across the first cell frame section and the second cell frame section, wherein the one or more vapor chambers contact one or more portions of thermal interface material to transfer heat from the battery cells to the vapor chamber. Each cell bank may also include one or more springs corresponding to the one or more vapor chambers, wherein each spring is positioned to contact at least one of the one or more battery cells serpentined by one of the corresponding vapor chambers to cause the one or more battery cells to contact corresponding portions of thermal interface material.

In yet another example, a power supply device is disclosed that includes an enclosure configured to house one or more cell banks. The power supply device may also include one or more cell banks provided within the enclosure, wherein each cell bank includes a first cell frame section, defining a first surface of the cell bank, including a plurality of recesses to align battery cells. Each cell bank may also include a second cell frame section, defining a second surface of the cell bank opposite to the first surface of the cell bank, to align the battery cells, wherein at least one of the first cell frame section and the second cell frame section comprises a material that provides conductive connections between battery cells to create a string of cells with a combined power output. Each cell bank may further include one or more portions of thermal interface material contacting the battery cells to transfer heat from the battery cells. Each cell bank may also include one or more vapor chambers provided between the first cell frame section and the second cell frame section, wherein the one or more vapor chambers extend across the first and second cell frame sections and between the one or more battery cells, wherein the one or more vapor chambers contact one or more portions of thermal interface material to transfer heat from the battery cells to the vapor chambers. Each cell bank may additionally include one or more springs corresponding to the one or more vapor chambers, wherein each spring is integrated into at least one of the first and second cell frame sections and positioned to contact at least one of the one or more battery cells contacted by at least one of the corresponding vapor chambers to cause the one or more battery cells to contact corresponding portions of thermal interface material.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DESCRIPTION OF DRAWINGS

FIGS. 9A and 9B illustrate an example battery stack, according to an example embodiment.

DETAILED DESCRIPTION

Figure 1:
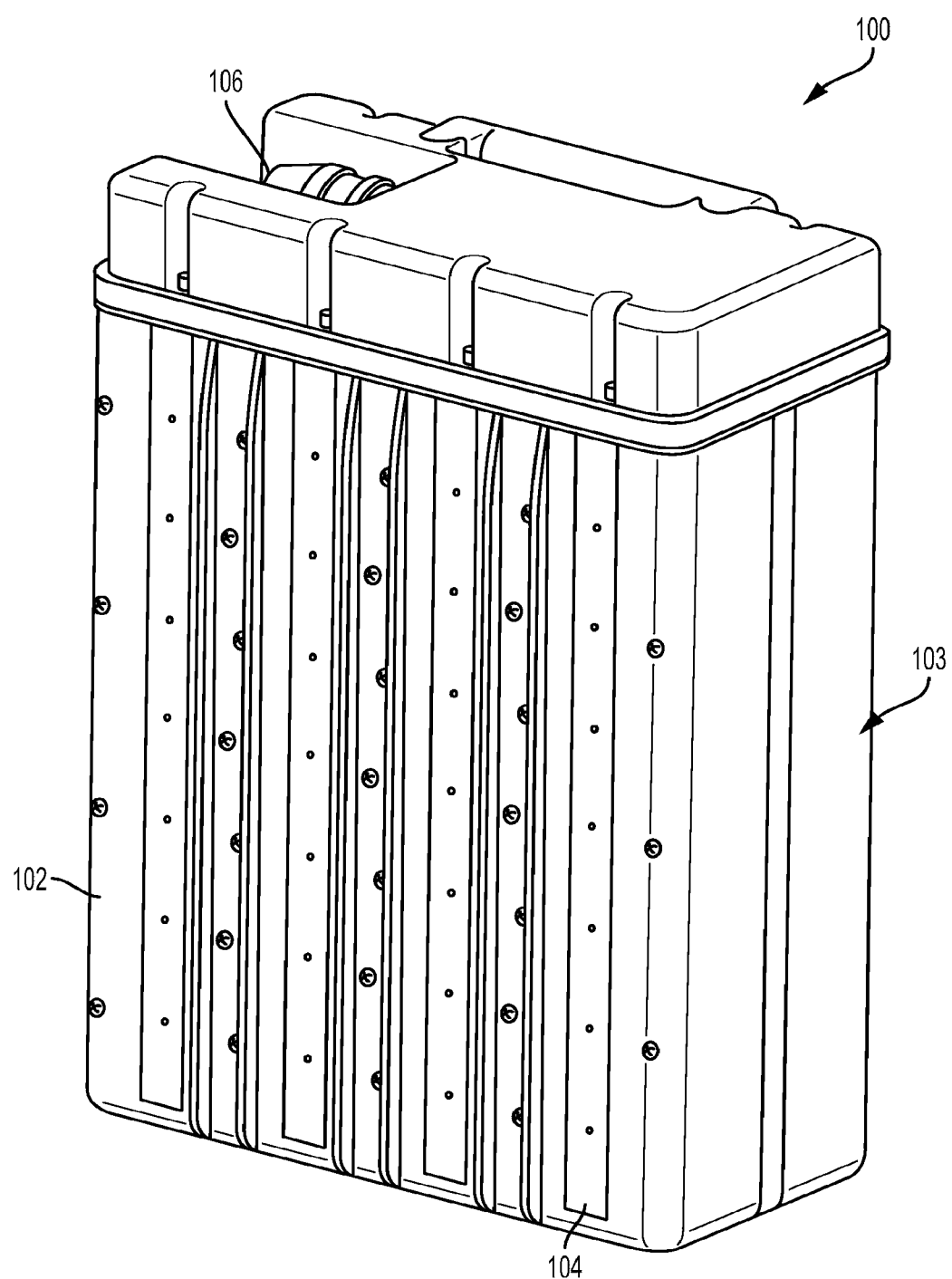
FIG. 1 illustrates an example power supply device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Various electrical systems may rely on batteries as a power source. Temperature for some types of batteries, such as lithium ion batteries, may increase during operation. If the battery gets too hot, it's possible that the battery may rupture, leak, and/or malfunction. For a device relying on many batteries as a power source, repair and/or replacement of batteries can be time-consuming and expensive. Thus, effective thermal management of batteries to prevent failure can improve the reliability and/or operation of electrical systems powered by batteries.

Accordingly, a system is described that may efficiently cool batteries during operation. The system may include an enclosure, a heat bus, and a cell frame that houses the batteries. The cell frame may include first and second cell frame sections that define surfaces of the cell bank. The first and second cell frame sections may include dividers that force apart the batteries to make contact with the heat bus through a flexible thermal interface material. The first and second cell frame sections may align the batteries for welding to weld straps to generate a combined power output by a string of welded battery cells.

The heat bus may be disposed between the first and second cell frame sections and include heat pipes and a heat sink. The batteries may be cooled by transferring heat from the batteries to the heat pipes of the heat bus. The heat may then be transferred from the heat pipes to the heat sink of the heat bus. Thermal interface material may be disposed between the heat pipes of the heat bus and the batteries to enhance contact and/or heat transfer. In some embodiments, vapor chambers may be used instead of heat pipes.

The heat sink for the cell bank may be inserted into an enclosure to attach the cell bank to the enclosure. The enclosure may house multiple cell banks. The heat sink may be exposed to the environment surrounding the enclosure, and thus release transferred heat from the batteries to the surrounding environment. The enclosure may provide a watertight seal that prevents entry of liquid into the enclosure.

The battery thermal management system may provide efficient cooling of the batteries by using heat pipes (or vapor chambers). In particular, the heat pipes (or vapor chambers) may allow a large amount heat to be transferred from the batteries to the heat sink via the heat pipes (or vapor chambers) during a given amount of time. The provided system may also enable isothermal cooling of the batteries of the cell bank. Specifically, each battery may transfer heat to a portion of thermal interface material, which then transfers heat to heat pipes (or a vapor chamber) of the heat bus. Thus, the system can regulate battery temperature efficiently and maintain similar heat loads for each battery.

The cell frame may exert a force against adjacent batteries and cause the batteries to make better thermal contact with the heat bus by way of a thermal interface material. Once the batteries are forced apart, the intra-cellular spacing of the cell frame may accommodate swelling of the batteries at a midsection over time. As a result, the batteries are less likely to rupture, leak, and/or malfunction due to the battery midsections being constrained after swelling by rigid objects (such as other batteries), making the cell bank more reliable. Further, the cell frame may align the batteries for rapid welding to weld straps. Thus, manufacturing and/or assembly of the cell banks may be quicker due to the cell frame design for rapid welding.

The enclosure may provide a watertight seal that prevents entry of liquid into the enclosure. Thus, the batteries of the cell bank are unlikely to short-circuit due to external liquids being present within the enclosure, which improves the reliability of the cell banks. Also, the enclosure can be made larger or smaller to house more or fewer cell banks, depending on the application. Thus, the cell bank system is scalable. Also, the materials used for the cell bank and enclosure provide for a lightweight system. Thus, the system can be used with various electronic systems (such as robotic devices) can benefit from using a lightweight power supply system.

FIG. 1 illustrates an example power supply device, according to an example embodiment. FIG. 1 includes power supply device 100, enclosure 102, exterior surface 103, heat sink attachment 104, and electrical signal attachment 106. Power supply device 100 may provide power to various electrical systems. An electrical system may receive power from power supply device 100 via a connection to electrical signal attachment 106.

For example, power supply device 100 may be provided with a robotic device. Power supply device 100 may power various components of the robotic device, including one or more processors, one or more actuators, and/or other components of the robotic device. The components may receive power via a connection to electrical signal attachment 106 of the power supply device 100. In other examples, power supply device 100 may be provided with other types of electrical systems.

Figure 2:
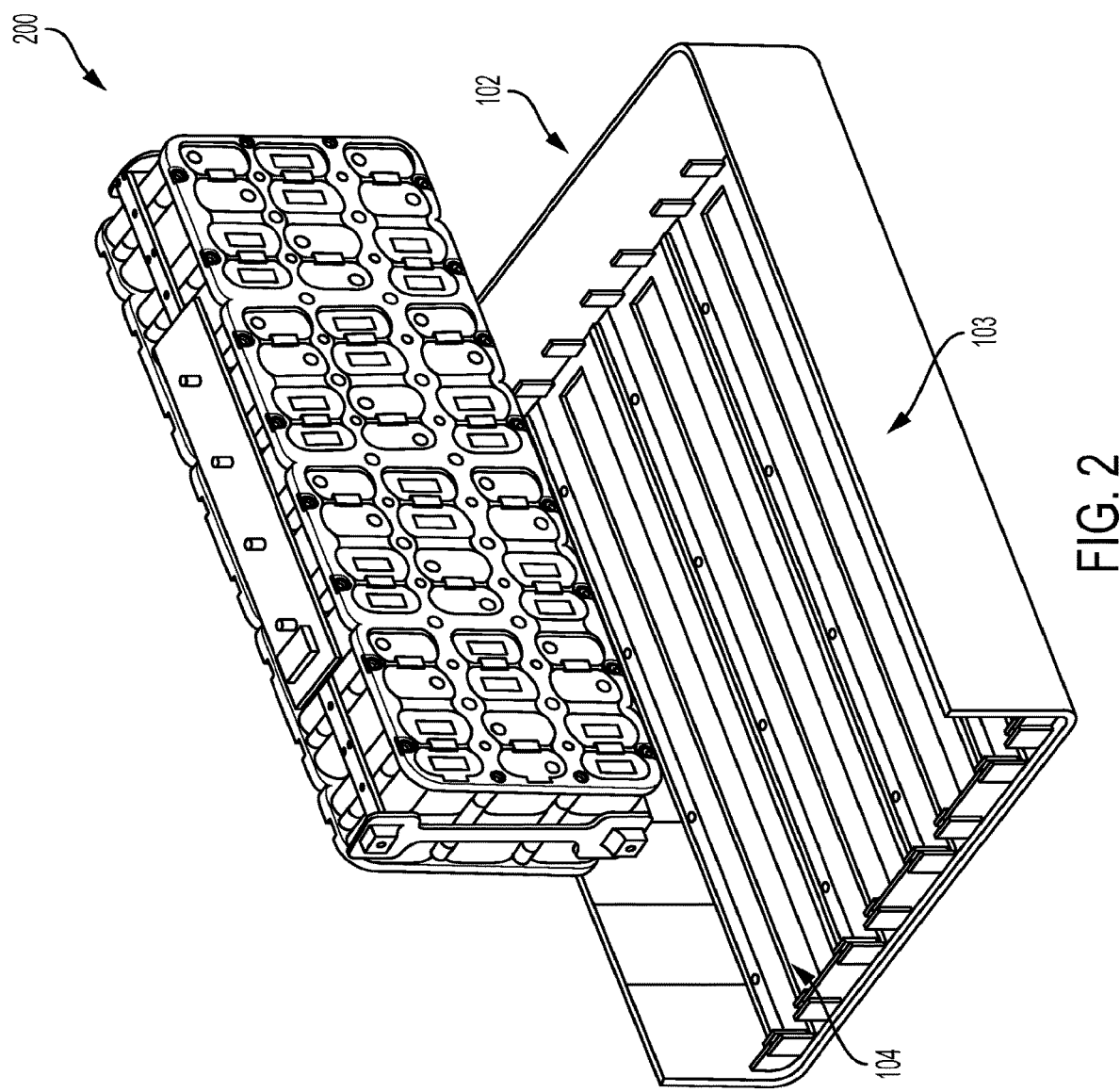
FIG. 2 illustrates an example assembly of an example power supply device, according to an example embodiment.

FIG. 2 illustrates a view of a portion of an interior assembly of power supply device 100. FIG. 2 displays a portion of the enclosure 102 with the heat sink attachment 104, and cell bank 200. One or more of the cell banks 200 can be inserted into the enclosure 102 of power supply device 100. In the displayed embodiments of FIGS. 1 and 2, up to four cell banks can be inserted into enclosure 102. The cell bank 200 is attached to the enclosure 102 by inserting the heat sink (shown in FIG. 3B) of the cell bank 200 into the heat sink attachment 104 of enclosure 102. By doing so, the heat sink may be exposed to the environment surrounding the power supply device 100.

In one example, the enclosure 102 provides a watertight seal for the cell bank(s) 200. In particular, the enclosure 102 may not permit entry of liquid into the enclosure 102 once the enclosure 102 has been sealed with cell banks 200 inserted into the heat sink attachments 104. As a result, the cell banks 200, which contain batteries, can be completely sealed from the environment surrounding the power supply device when the cell banks 200 are within the sealed enclosure 102. Thus, the reliability of the cell banks and their corresponding batteries is increased by the watertight, sealed enclosure.

For example, the power supply device 100 could be submerged in water without damaging the cell bank. In particular, the exterior surface 103 of the enclosure 102 and heat sinks 310 (see FIG. 3B) of the cell banks 200 would release heat from the batteries to the water, thereby cooling the batteries. No liquid would enter the enclosure, thus ensuring that none of the batteries of the cell banks 200 would short-circuit. The reliability of power supply device 100 and cell banks 200, therefore, is improved by using the watertight, sealed enclosure 102.

The heat sink attachment 104 may be a notch provided within the enclosure 102. The heat sink attachment 104 permits the heat sink 310 (see FIG. 3B) of cell bank 200 to be inserted into the notch (heat sink attachment 104) to attach the cell bank 200 to the enclosure 102. Once inserted into the heat sink attachment 104, the heat sink 310 of the cell bank 200 may be exposed to the surrounding environment outside of the power supply device 100. The heat sink 310 receives heat transferred from the batteries of the cell bank 200. Because the heat sink 310 may be exposed to the surrounding environment outside of the power supply device 100 after insertion through the heat sink attachment 104, the heat sink 310 can receive heat transferred from the batteries of cell bank 200 and release the transferred heat to the surrounding environment outside of the power supply device 100.

By exposing the heat sink 310 to the exterior environment while still maintaining a watertight seal at the enclosure 102, the power supply device 100 provides a conduction path from the batteries of cell bank 200 to an exterior surface of the power supply device 100, in this case the heat sink of the cell bank 200. Thus, heat can be transferred from the batteries to the exterior of the power supply device 100 without entry or use of fluids from the environment outside of the power supply device 100. This configuration reduces the chance of the batteries short-circuiting and improves the reliability of the power supply device 100.

Another feature of power supply device 100 is that it is scalable. In particular, while the displayed enclosure 102 in FIG. 2 can house up to four cell banks, a larger enclosure 102 could be used to house more than four cell banks for the power supply device. Thus, the power supply device can be scaled up to include more cell banks to provide power to one or more electrical systems requiring more power. Alternatively, a smaller enclosure 102 could be used to house fewer than four cell banks for electrical systems that require less power from the power supply device 100. Thus, the power supply device is scalable and can be sized to meet the requirements of the electrical system powered by the power supply device 100.

Another feature of the power supply device 100 of FIGS. 1 and 2 is that it is lightweight. A lightweight power supply device can be useful for various applications, such as powering robotic devices. In particular, because the power supply device 100 is lightweight, the robotic device can still execute tasks without being burdened or weighted down by a heavy power supply device. The power supply device is lightweight for at least two reasons. First, the device 100 does not require external fluids for cooling the battery cells.

Second, lightweight materials (such as plastic, aluminum, etc.) are used for the various components of the device 100, which are described later. Other embodiments, features, configurations, and/or benefits of the power supply device 100 may also be possible.

Figure 3A:
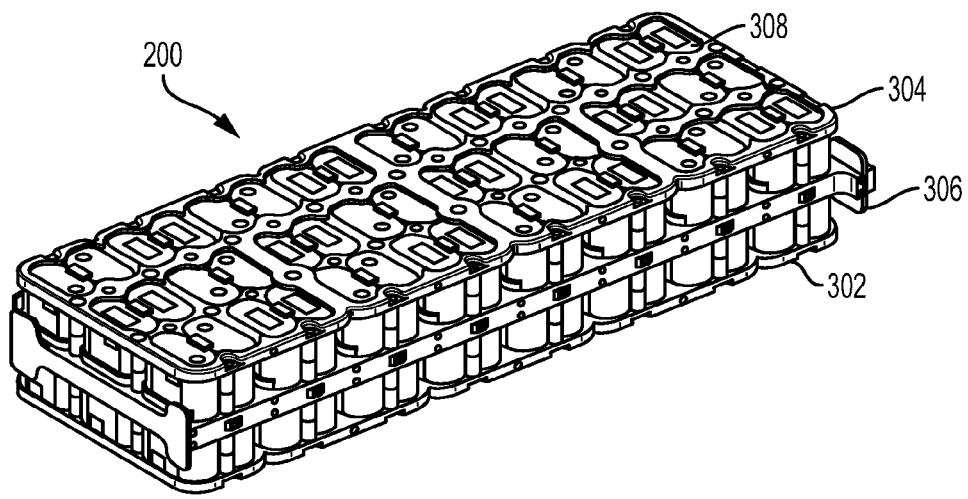
FIGS. 3A and 3B illustrate an example cell bank, according to an example embodiment.
Figure 3B:
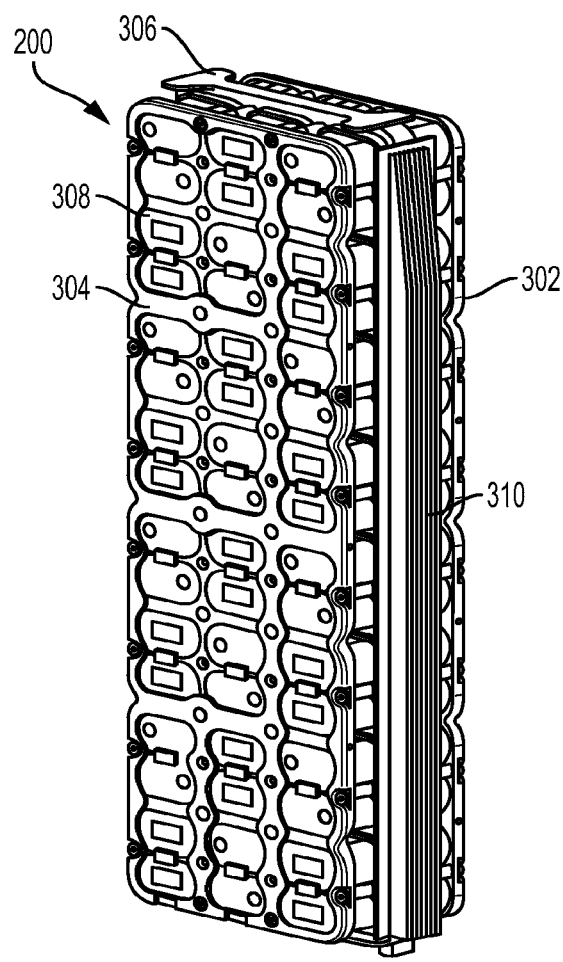

FIGS. 3A and 3B illustrate perspective views of an example cell bank, according to an example embodiment. In the displayed embodiments, the cell bank 200 includes a first cell frame section 302, a second cell frame section 304, and a heat bus 306. The second cell frame section 304 includes multiple second cell frame section recesses 308, while the heat bus 306 includes heat sink 310, as shown by FIG. 3B. In other embodiments, the cell bank 200 may include more, fewer, and/or different components than those displayed in FIGS. 3A and 3B.

The first and second cell frame sections define surfaces of the cell bank 200. In particular, the first cell frame section 302 defines a first surface of the cell bank 200, while the second cell frame section 304 defines a second surface of the cell bank 200 opposite to the first surface (first cell frame section 302) of the cell bank 200. In other embodiments, other configurations of the cell bank may be possible.

The heat bus 306 is located between the first cell frame section 302 and the second cell frame section 304. In FIG. 3B, the heat bus 306 shows the heat sink 310 attached to the heat bus 306. As mentioned with respect to FIG. 2, the heat sink 310 receives heat transferred from the batteries of cell bank 200 to the heat bus 306. Because the heat sink 310 is inserted into heat sink attachment 104 (see FIGS. 1 and 2) and exposed to the environment outside of the power supply device 100 (see FIGS. 1 and 2), the heat sink 310 can release the heat transferred from the battery cells to the surrounding environment. Other configurations of heat sink 310 are also possible.

The second cell frame section 304 may comprise a lightweight metal, such as aluminum. However, other lightweight metals and/or materials could also be used. The second cell frame section 304 may include a plurality of second cell frame section recesses 308. The recesses 308 may allow openings in the second cell frame section 304 to permit welding of one or more weld straps to the battery cells in cell bank 200. The recesses 308 may also help align the batteries of cell bank 200 for welding to the weld straps.

Although not displayed in FIG. 3B, the first cell frame section 302 may have a similar design to the second cell frame section 304. First, the first cell frame section 302 may also comprise a lightweight metal, such as aluminum. Second, the first cell frame section 302 may also have a plurality of recesses (e.g., recesses 400 in FIG. 4) that allow openings in section 302 to permit welding of one or more weld straps to the battery cells in cell bank 200. Third, the recesses of the first cell frame section 302 may help align the batteries of cell bank 200 for welding to the weld straps.

Figure 3C:
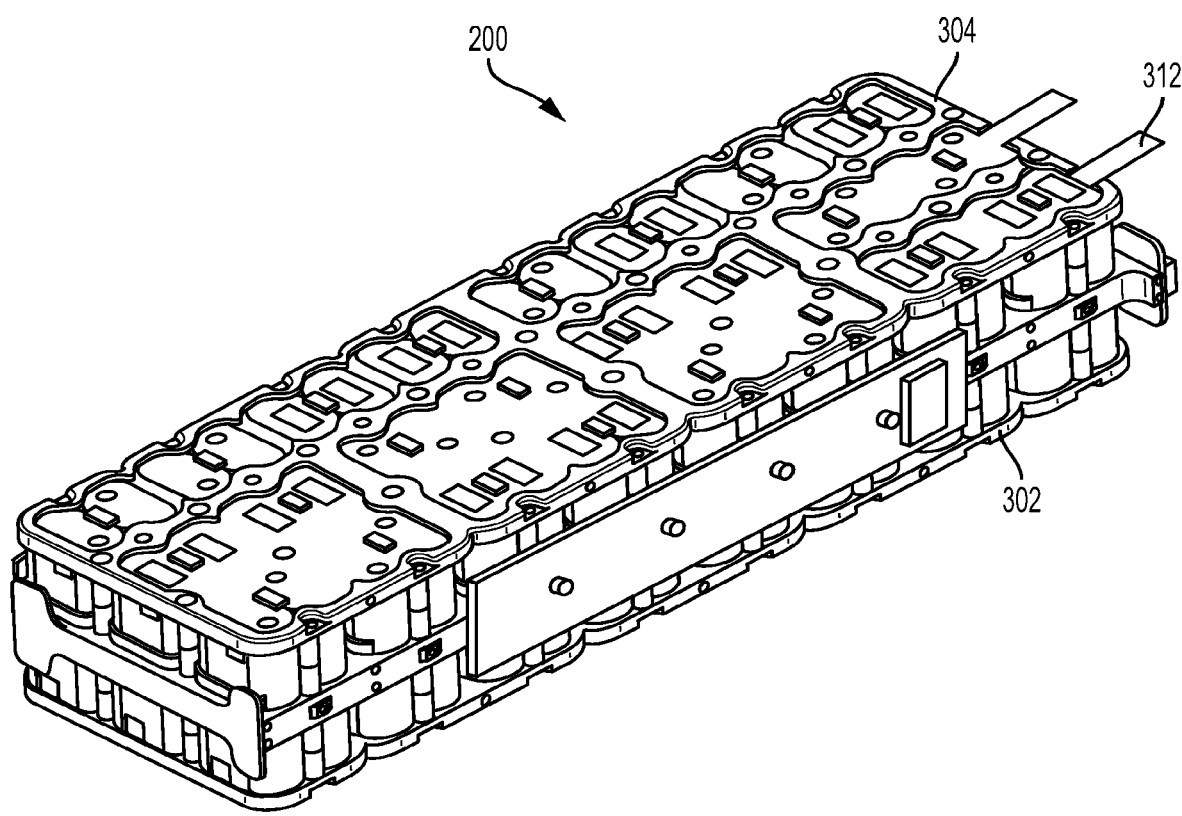
FIG. 3C illustrates another example cell bank, according to an example embodiment.

FIG. 3C illustrates another perspective view of the example cell bank, according to an example embodiment. In FIG. 3C, cell bank 200 includes the first cell frame section 302, the second cell frame section 304, and weld straps 312. The weld straps 312 may be one or more sheets of nickel that are welded to battery cells exposed by the recesses 308 (see FIGS. 3A and 3B). The weld straps 312, once welded to the battery cells, may connect multiple cells into a string of cells with a combined power output. The weld straps 312 may define the electrical connection between the cells. In particular, the weld straps 312 may define whether cells are in parallel or serial with each other for a cell bank 200.

Although FIG. 3C only displays weld straps 312 at openings for the second cell frame section 304, the weld straps 312 may also be welded to battery cells at openings in the first cell frame section 302. Further, the weld straps 312 may also define an electrical connection between the cells (e.g., parallel or serial) at both the first and second cell frame sections 302 and 304, respectively. The weld strap 312 may also connect multiple cells into a string of cells with a combined power output at both the first and second cell frame sections 302 and 304, respectively.

For example, in a bank of 48 cells, the weld straps may be configured so that the cells are electrically connected with 4 cells in parallel and 12 cells in series. If each cell has a voltage of 3V, then this example bank has a total bus voltage of 36V with 4 times the current capacity of a single cell. If a single cell is rated for 2000 mAH, then the bank with 4 cells in parallel is rated for 8000 mAH. Other configurations for welding the weld straps 312 to the batteries of cell bank 200 are possible.

The cell frame sections 302 and 304 enable rapid welding of weld straps 312 to the batteries of cell bank 200 by aligning the batteries for welding. Rapid welding allows for quicker assembly and manufacturing of the cell banks 200, as well as the power supply device 100. Thus, the cell frame configuration of cell bank 200 enables quicker and more cost effective manufacturing of power supply device 100. Other configurations of cell banks 200 are also possible.

Figure 4:
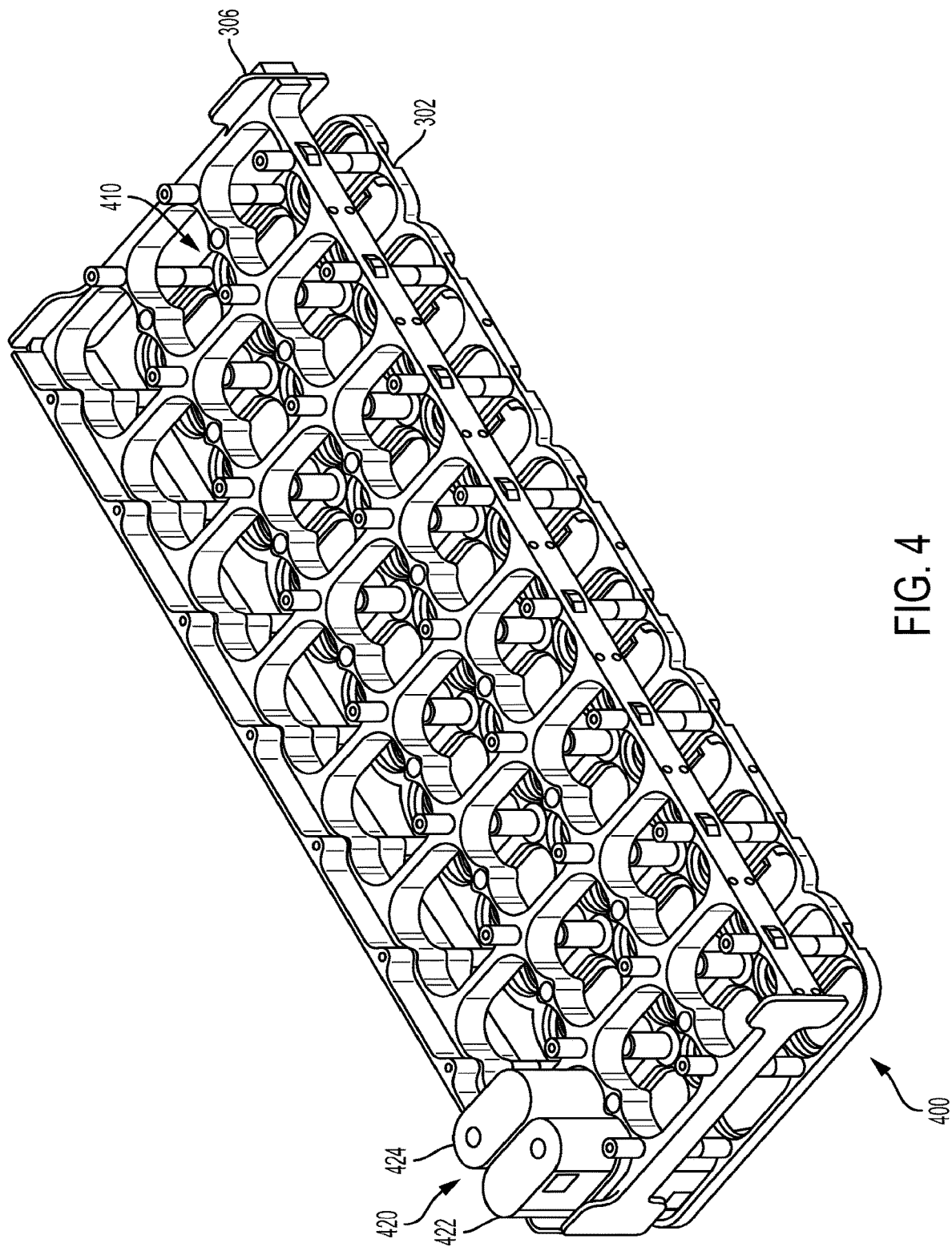
FIG. 4 illustrates an example assembly of a cell bank, according to an example embodiment.

FIG. 4 illustrates an example assembly of a portion of cell bank 200, according to an example embodiment. FIG. 4 displays heat bus 306 connected to the first cell frame section 302. The first cell frame section 302 includes a plurality of first cell frame section recesses 400. Heat bus 306 also includes heat bus openings 410. Further, FIG. 4 displays battery pack 420, which includes a first battery cell 422 and a second battery cell 424.

Similar to the second cell frame section 304, the first cell frame section recess 400 helps align the battery cells 422 and 424 of battery pack 420 for welding with weld straps 312 (see FIG. 3C) at the first cell frame section 302. The corresponding heat bus opening 410 may allow the battery cells 422 and 424 of battery pack 420 to make contact with the heat bus 306 through thermal interface material (see FIGS. 6A and 6B). Other configurations for aligning the battery pack 420 for welding may also be possible.

Figure 5A:
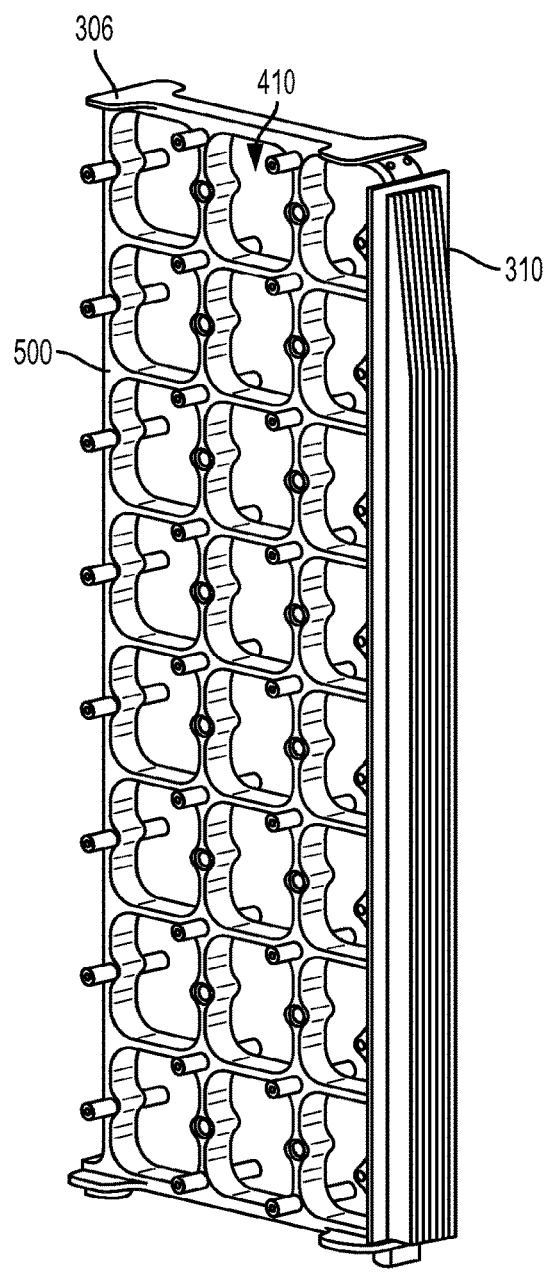
FIGS. 5A and 5B illustrate an example heat bus, according to an example embodiment.
Figure 5B:
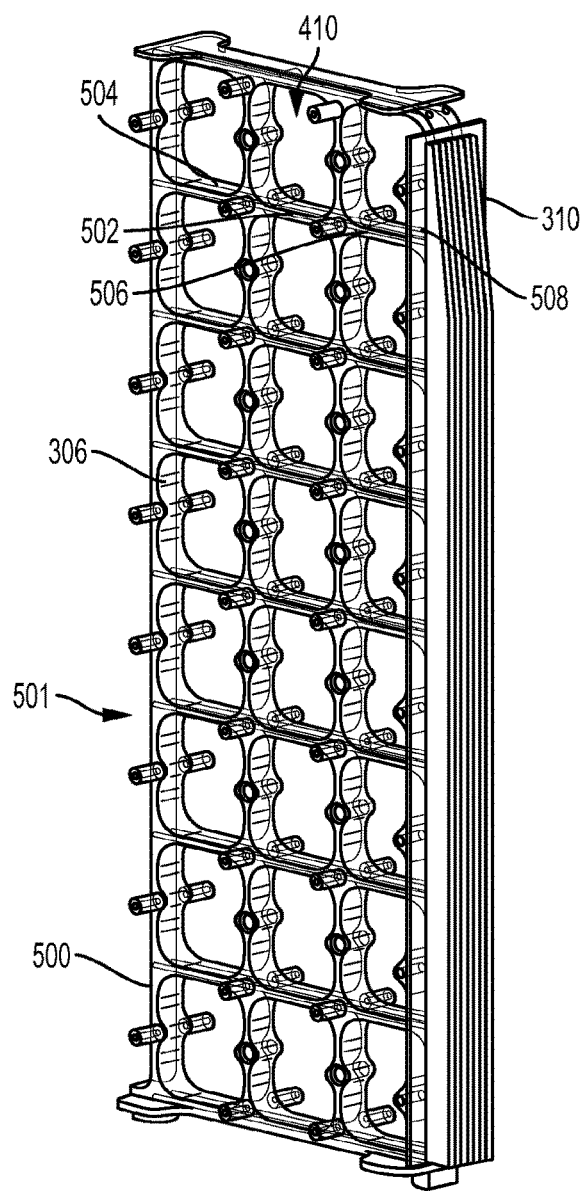

FIGS. 5A and 5B display a heat bus, according to an example embodiment. In the displayed embodiments, the heat bus 306 includes heat sink 310, heat bus openings 410, heat bus frame 500, and heat pipes 501. Heat pipes 501 also include a first heat pipe 502 and a second heat pipe 504. The first heat pipe 502 includes a heated surface 506 and a cold surface 508. In other embodiments, the heat bus 306 may include more, fewer, and/or different components than those components described for and/or displayed in FIGS. 5A and 5B.

Heat bus 306 cools the battery cells of a battery pack by transferring heat away from the battery cells. In particular, the heat bus 306 uses heat pipes 501 to receive and transfer heat away from the battery cells to a heat sink 310, which then releases heat into the surrounding environment. The heat bus 306 can provide isothermal cooling of each battery cell in the cell bank 200 by contacting each battery cell with heat pipes 501. Because each battery in cell bank 200 may experience a similar heat load, isothermal cooling may ensure that each battery is cooled a similar amount at a similar rate. Thus, each battery within cell bank 200 may have a similar temperature. As a result, isothermal cooling of the batteries provided by the heat bus 306 may improve the reliability of power supply device 100.

As shown in FIGS. 5A and 5B, the heat sink 310 may be attached to heat bus 306 such that heat sink 310 extends across the heat bus 306. The heat sink 310 may be connected to all of the heat pipes 501 of heat bus 306. As a result, the heat sink 310 can receive heat transferred from the battery cells to the heat pipes 501 from all of the heat pipes 501. Because the heat sink 310 is exposed to an environment outside of the power supply device 100 (see FIG. 2), the heat sink 310 can release heat transferred from the batteries to an environment surrounding the power supply device 100, and thus outside of the power supply device 100. In one embodiment, the heat sink 310 may be a fluid manifold that acts as a cooling surface for the heat bus 306.

The configuration of the heat sink 310 being outside of the enclosure 102 provides a conduction path from the cell bank battery cells to the outside of the enclosure 102, without exposure of the batteries to external fluids passing through inside the enclosure 102. This configuration prevents the batteries from short-circuiting due to contact with liquids. Thus, this configuration provides a more reliable cell bank 200 and a power supply device 100.

FIG. 5B displays heat pipes 501 throughout the heat bus 306. The heat pipes 501 efficiently transfer heat from the battery cells to the heat sink 310. Specifically, the heat pipes 501 can transfer a large amount heat in a short amount of time, thereby making heat pipes an efficient method of cooling the batteries. In FIG. 5B, the heat pipes 501 extend across the entire heat bus 306 and contact heat sink 310. Additionally, heat pipes 501 are located in between, and at the edge, of every heat bus opening 410. As a result, every battery in the heat bus 306 transfers heat to heat pipes 501, which results in isothermal cooling of the batteries.

In FIG. 5B, each heat bus opening 410 is surrounded by a pair of heat pipes on each side of each heat bus opening 410. For example, heat bus opening 410 has an edge defined by a portion of the heat bus which includes a first heat pipe 502 and a second heat pipe 504. In other embodiments, a portion of the heat bus defining an edge of the heat bus opening 410 may include more or fewer heat pipes than the two heat pipes displayed in FIG. 5B. In the displayed embodiment, the heat pipes 502 and 504 may extend across the heat bus in parallel and have a similar geometry. For example, heat pipes 502 and 504 may both be 120 mm long and 2 mm in diameter. However, other embodiments are also possible.

Heat pipes 501 may rely on thermal conductivity and phase transitions to transfer heat from the batteries of cell bank 200 to the heat sink 310. For example, heat pipe 502 may include a liquid that evaporates into vapor as it passes along a heated surface 506 of the heat pipe 502. When the liquid evaporates into a vapor, the liquid absorbs heat from the heated surface 506. The vapor may continue along the heat pipe 502 towards a cold surface 508 of the heat pipe 502, and condense back into the liquid. When the vapor condenses into a liquid, heat may be transferred from the vapor to the cold surface 508 of the heat pipe 502. The condensed liquid may then return to the heated surface 506 of the heat pipe 502 to repeat the heat transfer cycle.

In the displayed embodiments of FIGS. 4, 5A, and 5B, the cold surface 508 for heat pipe 502 may be caused by contact with heat sink 310. The heated surface 506 for heat pipe 502 may be caused by contact with thermal interface material 600 receiving heat from the batteries (see FIGS. 6A and 6B). Heated surface 506 for heat pipe 502 may be present along the heat pipe 502 where the heat pipe 502 contacts thermal interface material 600 (such as at heat bus openings 410).

Thus, when the liquid of the heat pipe 502 evaporates into a vapor, the heat pipe 502 absorbs heat from the heated surface 506 of the heat pipe 502. The heat pipe 502 has a heated surface 506 because heat is transferred from the batteries to the heated surface 506 via thermal interface material 600 (see FIGS. 6A and 6B). Therefore, when the liquid of the heat pipe 502 evaporates into a vapor, the liquid absorbs heat to cool the batteries.

Further, when the vapor of the heat pipe 502 condenses into a liquid, heat may be transferred from the vapor to the cold surface 508 of the heat pipe 502. The heat pipe 502 has a cold surface 508 because heat is transferred to the heat sink 310 from the cold surface 508 contacting the heat sink 310. In this manner, heat pipe 502 can transfer heat from the batteries of cell bank 200 to the heat sink 310. Heat pipes 501 and 504 may operate in a manner similar to that of heat pipe 502. Vapor chambers (discussed in FIGS. 8A, 8B, 9A, and 9B) may transfer heat from batteries to the heat sink in a manner similar to that of the heat pipes 501.

The heat bus frame 500 may comprise aluminum, while the heat pipes 501 may comprise corrugated copper and may be soldered into the heat bus frame 500. Because this fabrication allows for the heat pipes 501 and heat bus frame 502 to act as one part, the heat bus 306 can provide good thermal contact at the heat pipes 501, which allows for improved heat transfer from the batteries of cell bank 200. In other embodiments, the heat bus 306 may rely on other efficient heat transfer devices, such as vapor chambers. Other configurations of the heat bus 306 are also possible.

For example, in one embodiment, the heat bus 306 may include fluid passages instead of heat pipes 501. In this embodiment, fluid may be circulated throughout the heat bus 306 using an external pump and/or an external reservoir. The external pump and/or external reservoir may be located outside the cell bank 200 and/or outside the enclosure 102. The heat bus may be a 3D printed structure, in this embodiment. However, other configurations of the heat bus 306 are also possible.

Figure 6A:
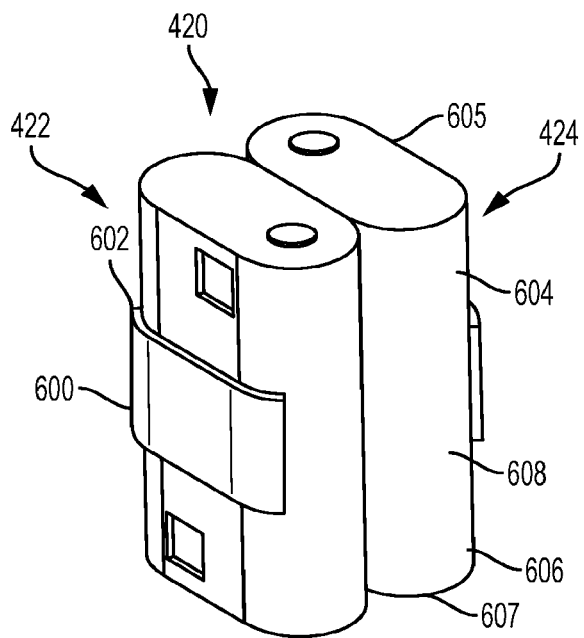
FIG. 6A illustrates an example battery pack assembly, according to an example embodiment.

FIG. 6A illustrates a battery pack assembly, according to an example embodiment. FIG. 6A shows battery pack 420, which includes a first battery 422 and a second battery 424. FIG. 6A also displays thermal interface material 600, which has a thickness 602. Second battery 424 includes a first end 604, a first edge 605, a second end 606, a second edge 607, and a midsection 608. In other embodiments, the battery pack assembly displayed in FIG. 6A may include more, fewer, and/or different components than those displayed in and/or described for FIG. 6A.

Thermal interface material 600 is disposed between heat bus opening 410 (see FIGS. 4, 5A, and 5B) and a battery cell, such as battery cells 422 and/or 424, to transfer heat from battery cells to the heat bus 306 (see FIGS. 3A, 3B, 3C, 4, 5A, and 5B). The thermal interface material 600 may be flexible and has properties conducive to transferring heat. In the displayed embodiment, thermal interface material 600 may be wrapped around the first and second battery cells 422 and 424 of battery pack 420. Alternatively, a portion of thermal interface material 600 may be disposed between each battery cell and the heat bus opening 410.

Battery pack 420 may include two batteries, such as batteries 422 and 424. However, battery pack 420 could include more than two batteries. In the displayed embodiment, batteries 422 and 424 are lithium-ion batteries providing 19.3 Wh, where Watt*Hours (Wh) are units for the total energy provided by the batteries. The capacity of the batteries is 5300 mAh with a nominal voltage of 3.65V. Heat dissipated may be approximately 1.125 W. However, in other embodiments, other types of batteries with different specifications may be used.

In FIG. 6A, the batteries 422 and 424 of battery pack 420 are not electrically connected to each other. However, in some embodiments, the batteries 422 and 424 may be electrically connected to each other in parallel or in series. Further, the batteries 422 and 424 may be connected with any number of other batteries of the cell bank 200 in parallel or in series. Thus, the battery pack 420 can be electrically connected to any number of other batteries in parallel, in series, or some combination of the two.

In the displayed embodiment, the cathode and anode of the batteries 422 and 424 may be on opposite ends (e.g., 604 and 606) of the batteries. As a result, weld straps 312 may be welded to the cathode and anode of the batteries 422 and 424 at openings in both the first cell frame section 302 and the second cell frame section 304 to provide an electrical connection. In other embodiments, the batteries may have an anode and cathode located on one end of the battery. In this case, weld straps 312 may only be welded to openings of a cell frame section (e.g., the first cell frame section 302 or the second cell frame section 304) corresponding to the location of the anode and cathode of the battery. Other configurations of the batteries 422 and 424 may also be possible.

In the displayed embodiment, batteries 422 and 424 are oriented such that battery 424 is rotated 180 degrees along a longitudinal axis of the battery 424 relative to battery 422. However, other orientations of the batteries 422 and 424 are also possible. In the displayed embodiment, the first end 604 of battery 424 is engaged by the second cell frame section 304 (see FIGS. 3A and 3B) while the second end 606 of battery 424 is engaged by the first cell frame section 302 (see FIGS. 3A, 3B, and 4). However, battery 424 could be flipped such that the first end 604 is engaged by the first cell frame section 302 and the second end 606 is engaged by the second cell frame section 304. Other orientations and configurations of the battery pack 420 and battery cells 422 and 424 are also possible.

Batteries 422 and 424 may swell at the midsection after usage over time. In particular, the midsection 608 of battery 424 may expand over time after battery 424 has been in service. If the batteries 422 and 424 are constrained from swelling at the midsection over time during use, the batteries may rupture, leak, and/or fail due to these constraints. As a result, cell bank 200 includes a flexible thermal interface material 600 and dividers 700 in the first cell frame section recesses 400 (see FIG. 7) to accommodate expansion of the battery cells over time. Furthermore, recesses 308 for the second cell frame section 304 may also include dividers 700 to push apart the battery cells 422 and 424 into the flexible thermal interface material 600 and accommodate expansion of the battery cells over time (not shown in FIG. 6A).

Figure 6B:
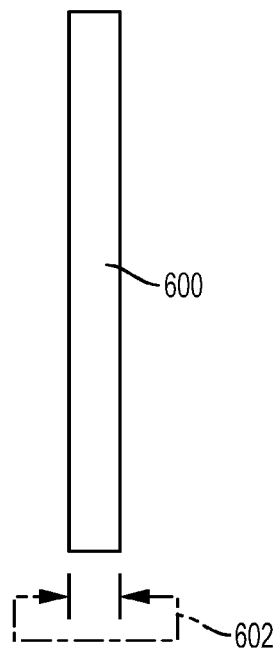
FIG. 6B illustrates an example portion of thermal interface material, according to an example embodiment.

FIG. 6B displays a portion of thermal interface material, according to an example embodiment. The thermal interface material 600 may include a thickness 602 that can be sized based on various factors. First, the thermal interface material 600 transfers heat from batteries 422 and 424 to the heat bus 306 (and specifically, heat pipes 501). In particular, the flexible, flat surfaces of the thermal interface material 600 can improve contact with both the battery cells 422 and 424 as well as the heat bus opening 410. During compression, the thermal interface material shape can conform to the curved shapes of battery cells 422 and 424, as well as the heat bus opening 310, which improves contact and heat transfer between the thermal interface material 600 and the contacted objects (battery cells 422 and 24 and heat bus opening 310).

Thus, the thermal interface material 600 may provide for efficient cooling of the battery cells 422 and 424 by the heat bus 306.

If the thermal interface material thickness 602 is too small, then the thermal interface material 600 may be unable to withstand compression, and thus, not provide the added contact and heat transfer. For example, the material 600 may be compressed such that the material thickness 602 is reduced to a value too small for the material 600 to effectively provide added contact and heat transfer. For another example, the material 600 may be punctured, torn, and/or broken during compression, and thus, not effectively provide the added contact and heat transfer.

However, if the thermal interface material thickness 602 is too large, then the amount of heat transferred from the batteries 422 and 424 to the heat bus 306 may be reduced. Based on these factors, the thermal interface material 602 may be sized to be a value small enough to transfer a large amount of heat, and thick enough to allow the material 600 to withstand compression.

Second, the thermal interface material 600 is a flexible material that can compress in response to expansion of the battery cells 422 and 424 over time. Thus, a thicker thermal interface material 600 can better accommodate swelling of the battery cells 422 and 424 over time. As a result, the thermal interface material 600 may have a larger thickness 602 to accommodate swelling of the battery cells 422 and 424 over time.

Third, the thermal interface material 600 may be compressed (with the battery cells 422 and 424) by dividers 700 of the first cell frame section and/or the second cell frame section (described in FIG. 7) or by one or more springs 930 (see FIG. 9B). Exerting a force against the battery cells 422 and 424 may improve contact (and thus heat transfer) between the battery cells 422 and 424, the heat bus 306, and the thermal interface material 600.

Figure 7:
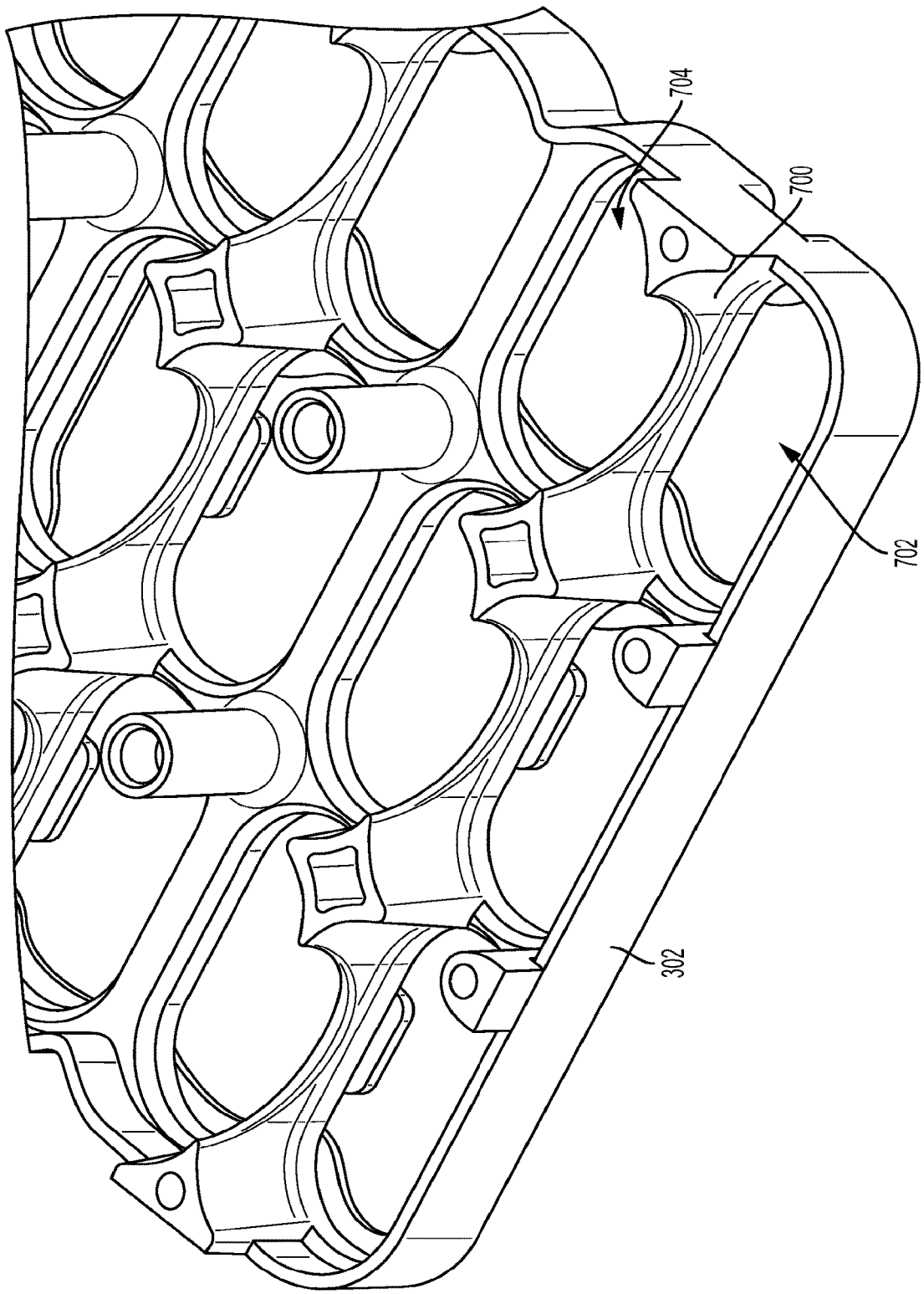
FIG. 7 illustrates a portion of an example cell frame section, according to an example embodiment.

FIG. 7 displays a portion of a cell frame section, according to an embodiment. FIG. 7 displays the first cell frame section 302, which includes multiple first cell frame section recesses 400 (see FIG. 4). The first cell frame section recess 400 includes a first side 702 and a second side 704, as well as a divider 700. The first cell frame section 302 may align the batteries of the cell bank 200 for welding to weld straps 312 at the first cell frame section 302. Additionally, the first cell frame section 302 can exert a force against the batteries of the cell bank 200 to enhance contact with thermal interface material 600 and accommodate swelling of the batteries over time. The second cell frame section 304 (not displayed) may also include dividers 700 to enhance contact with thermal interface material 600 and accommodate swelling of the batteries over time. Other purposes and configurations of the first and second cell frame sections 302 and 304, respectively, may also be possible.

The cell frame divider 700 may be located at the middle of recess 400 of the first cell frame section 302. As a result, when the cell frame divider 700 is wedged in between battery cells 422 and 424 of the battery pack 420, the divider 700 may push the battery cells 422 and 424 away from the center of the recess 400 and towards the edges of sides 702 and 704, respectively. This, in turn, causes the battery cells to be compressed against the thermal interface material 600, which improves contact and heat transfer from the batteries to the thermal interface material 600.

Also, the geometry of divider 700 is configured so that divider 700 engages an end of a battery (for example, end 604 or end 606 of the batteries), while leaving the midsection 608 of a battery untouched by the divider 700. As a result, when divider 700 is wedged between the batteries 422 and 424, the wedging creates spacing between the midsections 608 of the cells 422 and 424 in the middle of the recess 400. The created spacing accommodates expansion of the midsections 608 of battery cells 422 and 424. Thus, the curved geometry of the divider 700 allows for spacing at the midsection 608 of batteries 422 and 424.

In the displayed embodiment, the divider 700 may be configured to engage regions of a battery (such as end 604 or end 606) that are compliant with constraints provided by a battery manufacturer. For example, a manufacturer of battery 424 may require that battery 424 be engaged at regions (such as ends 604 or 608) within 4 mm of an edge of the battery (such as edges 605 and 607). However, a manufacturer may specify distances larger or smaller than 4 mm for compliant regions where the battery can be engaged. In response, the geometry of divider 700 may be configured differently such that the divider engages the battery in regions that are compliant with the constraints provided by the battery manufacturer. In other embodiments, a different geometry of the divider 700 may be used.

Additionally, the size of the divider 700 can be increased or decreased based on constraints similar to those listed for thermal interface material 600. For example, the divider size can be increased to increase the amount of spacing and/or force generated by the divider. As a result, the thickness 602 of the thermal interface material 600 may be increased in response to the increased size of the divider 700. In some embodiments, the thickness 602 of the thermal interface material 600 may be proportional to the size of the divider 700.

Alternatively, the size of the divider 700 may be decreased to enable the thermal interface material 600 to withstand the compression from the force generated by the divider. Another constraint that may cause the size of the divider 700 to be increased may be to increase the heat transferred from the batteries to the thermal interface material 600. Other constraints may be possible. Thus, the size of the divider 700 and the thermal interface material thickness 602 may be carefully calculated based on various constraints.

While FIG. 7 displays the divider 700 on the first cell frame section 302, the second cell frame section 304 may also include dividers 700 within recesses 308. The dividers 700 of the recesses 308 for the second cell frame section 304 may have a similar, or the same, location, geometry, configuration, constraints, and/or sizing as the dividers 700 for the first cell frame section. In particular, the dividers 700 may be located in the middle of recesses 400 to engage the ends of battery cells and push the cells into thermal interface material 600. Further, the sizing of dividers 700 for the second cell frame section may increase or decrease based on spacing, heat transfer, compression forces, and other constraints similar to, or the same as, the constraints listed above for the dividers 700 of the first cell frame section.

Figure 8A:
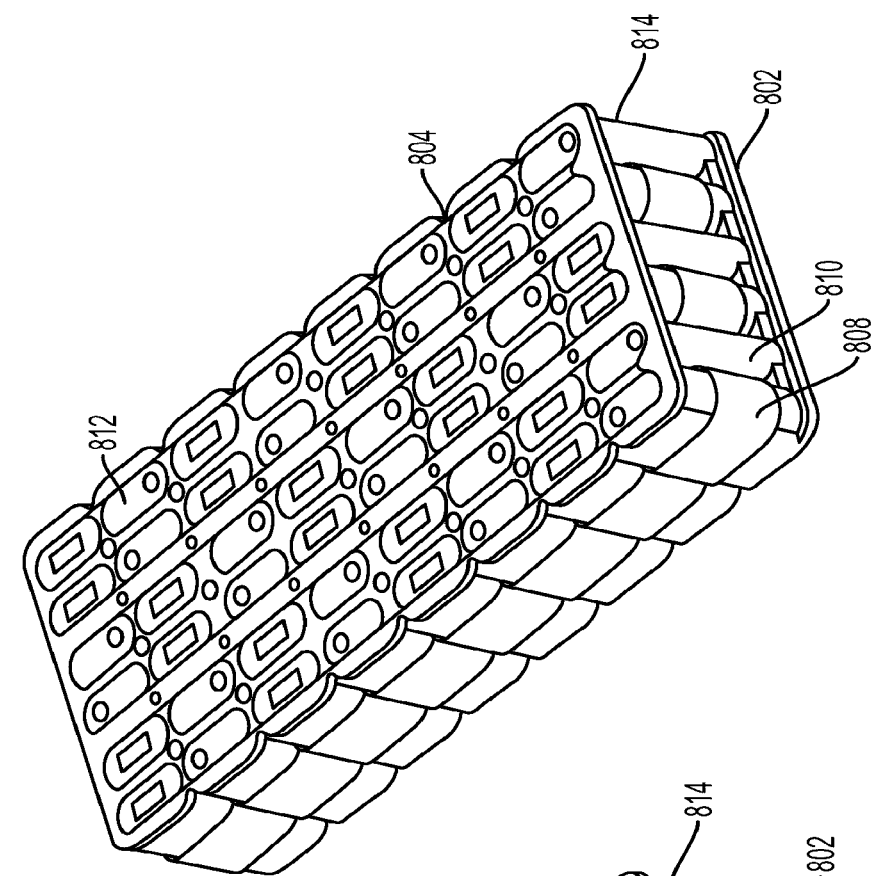
FIGS. 8A and 8B illustrate an example cell bank, according to an example embodiment.
Figure 8B:
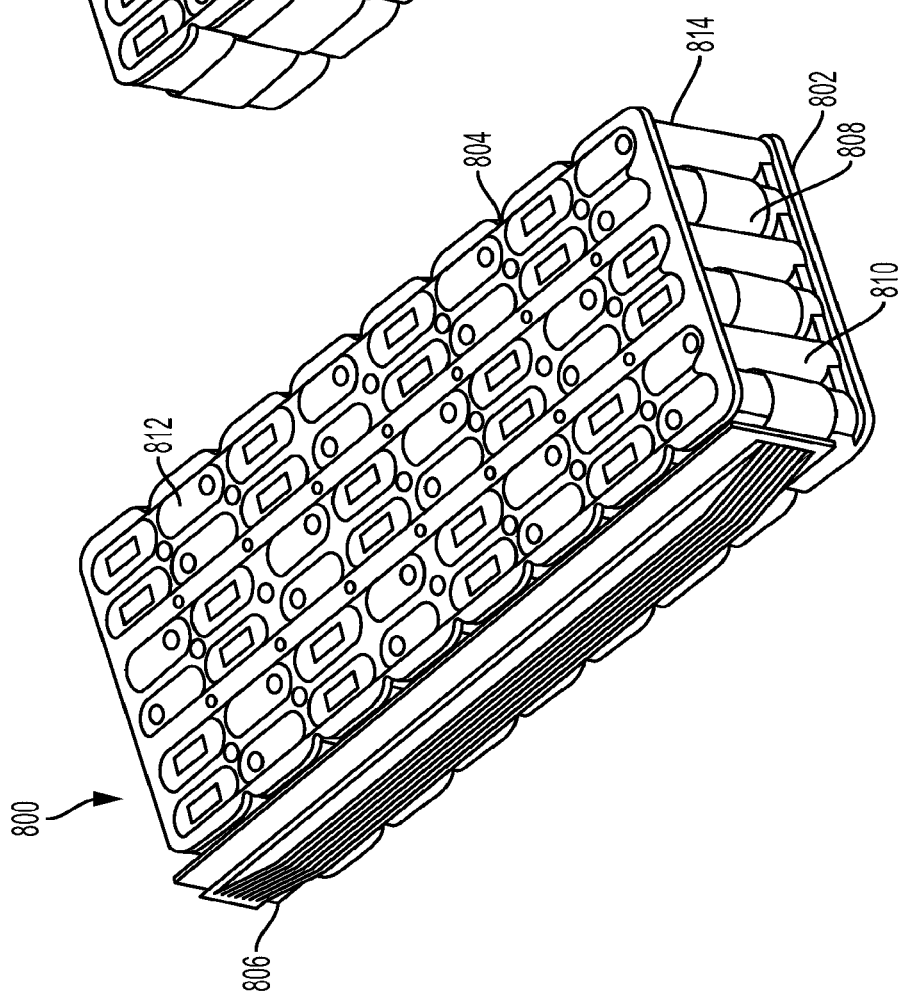

FIG. 8A displays a perspective view of an alternative embodiment of a cell bank for power supply device 100. FIG. 8A displays cell bank 800, which comprises a first cell frame section 802, a second cell frame section 804, a heat sink 806, vapor chambers 808, batteries 810, and cell bank edge 814. Similar to second cell frame section 304, the second cell frame section 804 may include recesses 812 which provide access to the batteries 810 for welding. Each recess 812 may correspond to one battery 810. FIG. 8B displays a perspective view of an assembly of the cell bank 800 without the heat sink 806. Other configurations of the alternative embodiment of the cell bank 800 are also possible.

Similar to the cell bank 200, the first cell frame section 802 and the second cell frame section 804 may include recesses to align the batteries for welding to weld straps at the two cell frame sections 802 and 804, respectively. However, neither the first cell frame section 802 nor the second cell frame section 804 has dividers. A compression force may be generated by one or more springs disposed within the cell bank 800.

FIG. 9A illustrates a battery stack, according to an example embodiment. The battery stack 900 can include one or more battery packs 901. The battery stack 900 includes batteries 902, 904, 906, 908, 910, and 912, while the battery pack 901 includes batteries 902 and 904. Thus, the battery stack 900 includes three battery packs. FIG. 9A also displays vapor chamber 808 and thermal interface material 920. FIG. 9B displays the battery stack 900, vapor chamber 808, and the thermal interface material 920 of FIG. 9A, along with spring 930. In some embodiments, the battery stacks of FIGS. 9A and 9B may include more, fewer, and/or different components than those displayed in or described for FIGS. 9A and 9B.

Although the battery stack 900 includes six batteries, the battery stack 900 could include more or fewer batteries than those displayed. Additionally, the battery pack 901 could include more than the two batteries displayed in FIG. 9A. The batteries of FIG. 9A may be similar to batteries 422 and 424. In particular, the batteries of FIG. 9A may be lithium-ion batteries that swell at a midsection of the battery over time when in use. The batteries of FIG. 9A may be cooled by the vapor chamber 808.

The vapor chamber 808 cools the batteries of battery stack 900 by transferring heat away from the batteries to an attached heat sink, such as heat sink 806. The vapor chamber 808 may operate in a manner similar to heat pipes 501 to transfer heat away from battery stack 900 to the heat sink 806. The vapor chamber 808 may be more efficient than heat pipes 501. In particular, vapor chamber 808 may transfer more heat during a same amount of time than the heat transferred by heat pipes 501 for a battery. In FIG. 9A, the vapor chamber 808 is shown in a serpentine configuration through the battery stack 900 such that the vapor chamber contacts thermal interface material 920 for each battery in the stack 900. Thus, the vapor chamber 808 could serpentine through more or fewer batteries, depending on how many batteries are within the stack 900.

Although FIG. 9A displays the vapor chamber 808 and a serpentine configuration through the battery stack 900, in other arrangements, the vapor chamber and the battery stacks could be arranged such that the vapor chamber could be one straight, flat sheet that contacts all batteries for a battery stack, similar to the heat pipes 501 of cell bank 200. Multiple vapor chambers could be used for multiple battery stacks within a cell bank. The multiple vapor chambers may connect to a common heat sink.

In this embodiment, a spring may be integrated into a cell frame of the cell bank. The spring may be configured to push the batteries into thermal interface material, which may be disposed between the batteries and the vapor chamber. In this way, the spring can improve contact between the batteries, the thermal interface material, and the vapor chamber. The spring can also accommodate swelling of the batteries over time. Other configurations of the vapor chamber and the battery stack 900 may also exist.

Thermal interface material 920 is disposed between vapor chamber 808 and each of the six batteries of battery stack 900 to improve contact and heat transfer between the vapor chamber 808 and the batteries of battery stack 900. The thermal interface material 920 may be similar to thermal interface material 600. Specifically, material 920 may be a flexible material with properties conducive to heat transfer. Although the material 920 is shown with a thickness 922 and disposed between the vapor chamber 808 and each surface of each battery of the stack 900, the portions of thermal interface material 920 can have a different thickness 922 and a different configuration than what is displayed in FIGS. 9A, 9B, and 9C.

FIG. 9B displays a spring 930 disposed between an edge 814 of cell bank 800 and a battery 912 of stack 900. In some embodiments, the spring 930 may be integrated into the cell frame of the cell bank 800. In the displayed embodiment, spring 930 may be initially compressed a particular distance to compress the batteries of the battery stack 900, thermal interface material 920, and a vapor chamber 808. Compressing the battery stack 900 may increase contact and heat transfer between the batteries 902, 904, 906, 908, 910, and 912 and thermal interface material 920. Additionally, compressing the battery stack 900 may also increase contact and heat transfer between vapor chamber 808 and thermal interface material 920.

The spring 930 may accommodate swelling of the batteries of battery stack 900. In particular, if any of the batteries of battery stack 900 swell over time, the spring 930 may compress even further in response to the swelling of the batteries of battery stack 900.

Spring 930 may be chosen based on the spring stiffness that is needed for the cell bank 800. A spring with a higher spring stiffness may generate a larger compression force against the battery stack 900 when the spring is initially compressed a particular distance. Additionally, a spring with a higher stiffness will compress less in response to swelling of the batteries of battery stack 920.

The amount of compression force generated by the spring 930 can also be modified by changing the distance that the spring 930 is initially compressed. In one example, the spring 930 may initially be highly compressed (i.e., initially compressed more than spring 930 is initially compressed in FIG. 9B). In this example, the highly compressed spring may exert a larger compression force against the battery stack 900. Also, the highly compressed spring may compress less in response to swelling of the batteries of battery stack 900. Other configurations of the spring 930 may also be possible.

Figure 9C:
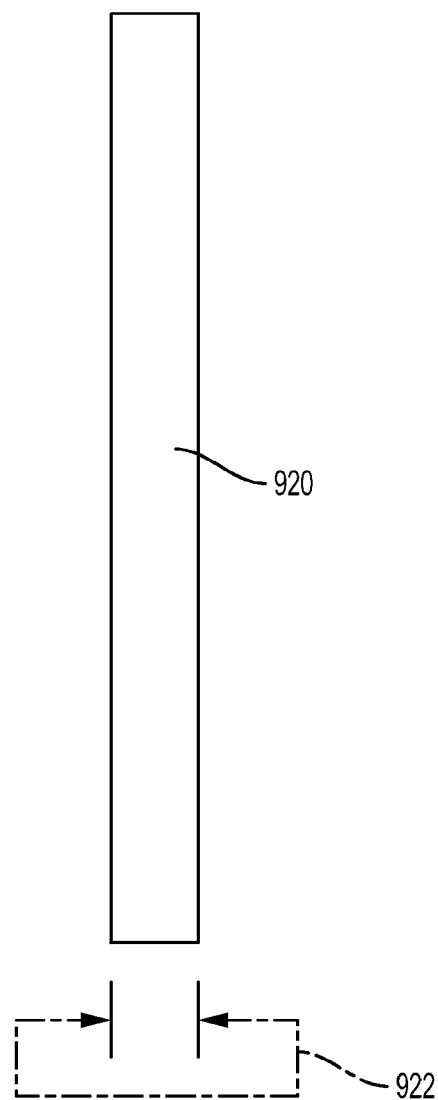
FIG. 9C illustrates an example portion of thermal interface material, according to an example embodiment.

FIG. 9C displays a portion of thermal interface material, according to an example embodiment. Similar to thermal interface material 600, thermal interface material 920 may include a thermal interface material thickness 922 that can be sized based on several factors. First, if the thickness 922 is too small, then the thermal interface material 920 may be unable to withstand compression, and thus, not provide enhanced contact and heat transfer between the vapor chamber 808 and batteries of the battery stack 900. For example, the material 920 may be compressed such that the material thickness 922 is reduced to a value too small for the material 920 to effectively provide added contact and heat transfer. For another example, the material 920 may be punctured, torn, and/or broken during compression, and thus, not effectively provide the added contact and heat transfer.

However, if the thermal interface material thickness 922 is too large, then the amount of heat transferred from the batteries of battery stack 900 to the vapor chamber 808 via the thermal interface material 920 may be reduced. Thus, the thickness 922 may be sized to be small enough to achieve a large heat transfer via material 920, but large enough to enable the material 920 to withstand compression.

Second, the thermal interface material thickness 922 may better accommodate expansion of the batteries of battery pack 900 when the thickness 922 is increased. Third, an increase in compression force generated from spring 930 (for example, due to an increased spring stiffness or distance the spring is initially compressed) may require an increased thickness 922 to allow the thermal interface material 920 to withstand the compression force. Other factors may also affect the thermal interface material thickness 922.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A power supply device comprising:
   an enclosure; and
   one or more cell banks housed within the enclosure, each cell bank comprising:
   a first cell frame section defining a first surface of the cell bank and including a plurality of recesses to align battery cells;
   a second cell frame section defining a second surface of the cell bank opposite to the first surface of the cell bank and aligning the battery cells in conjunction with the first cell frame section, at least one of the first cell frame section or the second cell frame section comprising conductive connectors for the battery cells, the conductive connectors configured to generate a combined power output for the battery cells;

one or more portions of thermal interface material contacting the battery cells to transfer heat from the battery cells;
a vapor chamber located between and spaced apart from the first cell frame section and the second cell frame section, the vapor chamber forming a serpentine path extending between the battery cells, and, along the serpentine path, the vapor chamber contacts the one or more portions of thermal interface material promoting heat transfer from the battery cells to the vapor chamber;
a spring configured to generate a spring force against at least one of the battery cells along the serpentine path of the vapor chamber, the spring force causing the vapor chamber to increase contact with the one or more portions of the thermal interface material; and
a heat releasing mechanism located between the first cell frame and the second cell frame, coupled to the vapor chamber, and partially exposed to an environment outside of the enclosure housing the one or more cell banks.

2. The power supply device of claim 1, wherein the spring increases the spring force against the at least one battery cell when one or more battery cells of the cell bank swells during operation of the battery cells.

3. The power supply device of claim 1, wherein each battery cell comprises a respective portion of thermal interface material to transfer heat from a respective battery cell, the heat generated during operation of the respective battery cell.

4. The power supply device of claim 3, wherein a first respective portion of thermal interface material disposed on a surface of a first respective battery cell faces a second respective portion of thermal interface material disposed on a surface of a second respective battery cell adjacent to the first respective battery cell.

5. The power supply device of claim 1, wherein each respective recess of the plurality of recesses for the first cell frame corresponds to a single battery cell.

6. The power supply device of claim 1, wherein the plurality of recesses align the battery cells with weld straps at the first cell frame section or the second cell frame section, the weld straps defining the conductive connector.

7. The power supply device of claim 1, wherein the serpentine path of the vapor chamber (i) contacts a first surface of a first battery cell of the battery cells, (ii) does not contact the first battery cell as the serpentine path extends between the first battery cell and an adjacent second battery cell of the battery cells, and (iii) contacts a second surface of the adjacent second battery cell, the second surface of the adjacent second battery cell opposite the first surface of the first battery cell.

8. The power supply device of claim 1, wherein the recesses of the first cell frame section align the battery cells of a respective cell bank in a row pattern, the row pattern comprising a first battery cell of the battery cells and a second battery cell of the battery cell spaced apart by (i) a first portion of the thermal interface material corresponding to and in contact with the first battery cell, (ii) a second portion of the thermal interface material corresponding to and in contact with the second battery cell, and (iii) the vapor chamber extending between the first battery cell and the second battery cell along the serpentine path.

9. The power supply device of claim 8, wherein the serpentine path of the vapor chamber contacts the first battery cell on a first side without the first portion of the thermal interface material and contacts the second battery cell on a second side without the second portion of the thermal interface material and opposite the first side of the first battery cell.

10. The power supply device of claim 1, wherein the thermal interface material contacts a middle portion of each battery cell, the middle portion of each battery cell being between a first end portion and a second end portion of a respective battery cell.

11. The power supply device of claim 10, wherein the thermal interface material is configured to maintain contact with the middle portion of each battery cell by flexing in response to the battery cells expanding over time.

12. The power supply device of claim 1, wherein the plurality of recesses of the first cell frame section engage a first end of the battery cells, and wherein the second cell frame section comprises a second plurality of recesses that engage a second end of the battery cells opposite to the first end of the battery cells.

13. The power supply device of claim 1, further comprising a heat sink that extends across the first cell frame section and the second cell frame section to contact the vapor chamber and to transfer heat from the vapor chamber to the heat sink, the heat sink inserted through a notch in the enclosure to transfer heat to an environment outside of the power supply device.

14. The power supply device of claim 1, wherein the enclosure is a watertight sealed enclosure.

15. The power supply device of claim 1, wherein the one or more portions of thermal interface material compress in response to the battery cells expanding at a midsection of the battery cells over time.

16. The power supply device of claim 1, wherein the serpentine path partially surrounds each battery cell of the battery cells.

17. The power supply device of claim 16, wherein the partial surrounding of each battery cell exposes a surface of each battery cell to an area devoid of both the vapor chamber and thermal interface material.

18. The power supply device of claim 1, wherein the spring is integrated into at least one of the first cell frame section or the second cell frame section.

19. The power supply device of claim 1, wherein the serpentine path of the vapor chamber extends along a midsection of each battery cell, the midsection spaced apart from the first cell frame section and the second cell frame section.

20. The power supply device of claim 1, wherein the vapor chamber is not in direct contact with a surface of any battery cell as the vapor chamber extends along the serpentine path between the battery cells that generate the combined power output.

21. A power supply device comprising:
an enclosure; and
one or more cell banks housed within the enclosure, each cell bank comprising:
a first cell frame section defining a first surface of the cell bank and including a plurality of recesses to align battery cells;
a second cell frame section defining a second surface of the cell bank opposite to the first surface of the cell bank and aligning the battery cells in conjunction with the first cell frame section;
one or more portions of thermal interface material contacting the battery cells to transfer heat from the battery cells;
a vapor chamber located between and spaced apart from the first cell frame section and the second cell frame section, the vapor chamber forming a serpentine path extending between the battery cells, and, along the serpentine path, the vapor chamber contacts the one or more portions of thermal interface material promoting heat transfer from the battery cells to the vapor chamber, wherein the serpentine path partially surrounds each battery cell of the battery cells, the partial surrounding of each battery cell surrounding a midsection side of each battery cell without thermal interface material.

* * * * *